United States Patent [19]

Hedrick

[11] Patent Number: 5,328,592
[45] Date of Patent: Jul. 12, 1994

[54] FCC REACTOR WITH TUBE SHEET SEPARATION

[75] Inventor: Brian W. Hedrick, Rolling Meadows, Ill.

[73] Assignee: UOP, Des Plaines, Ill.

[21] Appl. No.: 996,266

[22] Filed: Dec. 24, 1992

[51] Int. Cl.⁵ ............................................. C10G 11/00
[52] U.S. Cl. ................................. 208/113; 208/153; 208/161
[58] Field of Search .................... 208/113, 153, 161

[56] References Cited

U.S. PATENT DOCUMENTS

| | | | |
|---|---|---|---|
| 2,941,621 | 6/1960 | Dygert et al. | 183/92 |
| 3,137,133 | 6/1964 | Wilson et al. | 60/39.02 |
| 3,415,042 | 12/1968 | Wilson | 208/161 |
| 3,443,368 | 5/1969 | Wilson et al. | 55/435 |
| 3,541,766 | 11/1970 | Wilson | 55/348 |
| 4,295,961 | 10/1981 | Fahrig et al. | 208/161 |
| 4,310,489 | 1/1982 | Fahrig et al. | 208/161 |
| 4,364,905 | 12/1982 | Fahrig et al. | 208/161 |
| 4,624,771 | 11/1986 | Lane et al. | 208/74 |
| 4,624,772 | 11/1986 | Krambeck et al. | 208/95 |
| 4,701,307 | 10/1987 | Walters et al. | 208/161 |
| 4,737,346 | 4/1988 | Haddad et al. | 422/144 |
| 4,792,437 | 12/1988 | Hettinger, Jr. et al. | 422/147 |
| 5,104,517 | 4/1992 | Lomas et al. | 208/113 |
| 5,176,815 | 1/1993 | Lomas | 208/153 |

*Primary Examiner*—R. Bruce Breneman
*Assistant Examiner*—Walter D. Griffin
*Attorney, Agent, or Firm*—Thomas K. McBride; John G. Tolomei

[57] ABSTRACT

An FCC process uses a tube sheet arrangement and a multiplicity of centrifugal separation devices in an FCC reactor to reduce the volume of the reactor vessel thereby minimizing uncontrolled reaction of feed hydrocarbons and the production of riser by-products. The separation arrangement encloses an upwardly directed outlet end of a ballistic separation device in a low volume disengaging vessel that transfers dilute catalyst and product vapors to a tube sheet arrangement of swirl tubes that removes catalyst and directs it downwardly into a stripper arrangement.

12 Claims, 3 Drawing Sheets

FCC REACTOR WITH TUBE SHEET SEPARATION

FIELD OF THE INVENTION

The invention relates generally to processes for the fluidized catalytic cracking (FCC) of heavy hydrocarbon streams such as vacuum gas oil and reduced crudes. This invention relates more specifically to a method for reacting hydrocarbons in an FCC reactor and separating reaction products from the catalyst used therein.

BACKGROUND OF THE INVENTION

The fluidized catalytic cracking of hydrocarbons is the main stay process for the production of gasoline and light hydrocarbon products from heavy hydrocarbon charge stocks such as vacuum gas oils or residual feeds. Large hydrocarbon molecules, associated with the heavy hydrocarbon feed, are cracked to break the large hydrocarbon chains thereby producing lighter hydrocarbons. These lighter hydrocarbons are recovered as product and can be used directly or further processed to raise the octane barrel yield relative to the heavy hydrocarbon feed.

The basic equipment or apparatus for the fluidized catalytic cracking of hydrocarbons has been in existence since the early 1940's. The basic components of the FCC process include a reactor, a regenerator and a catalyst stripper. The reactor includes a contact zone where the hydrocarbon feed is contacted with a particulate catalyst and a separation zone where product vapors from the cracking reaction are separated from the catalyst. Further product separation takes place in a catalyst stripper that receives catalyst from the separation zone and removes entrained hydrocarbons from the catalyst by counter-current contact with stream or another stripping medium. The FCC process is carried out by contacting the starting material whether it be vacuum gas oil, reduced crude, or another source of relatively high boiling hydrocarbons with a catalyst made up of a finely divided or particulate solid material. The catalyst is transported like a fluid by passing gas or vapor through it at sufficient velocity to produce a desired regime of fluid transport. Contact of the oil with the fluidized material catalyzes the cracking reaction. During the cracking reaction, coke will be deposited on the catalyst. Coke is comprised of hydrogen and carbon and can include other materials in trace quantities such as sulfur and metals that enter the process with the starting material. Coke interferes with the catalytic activity of the catalyst by blocking active sites on the catalyst surface where the cracking reactions take place. Catalyst is traditionally transferred from the stripper to a regenerator for purposes or removing the coke by oxidation with an oxygen-containing gas. An inventory of catalyst having a reduced coke content, relative to the catalyst in the stripper, hereinafter referred to as regenerated catalyst, is collected for return to the reaction zone. Oxidizing the coke from the catalyst surface releases a large amount of heat, a portion of which escapes the regenerator with gaseous products of coke oxidation generally referred to as flue gas. The balance of the heat leaves the regenerator with the regenerated catalyst. The fluidized catalyst is continuously circulated from the reaction zone to the regeneration zone and then again to the reduction zone. The fluidized catalyst, as well as providing a catalytic function, acts as a vehicle for the transfer of heat from zone to zone. Catalyst exiting the reaction zone is spoken of as being spent, i.e., partially deactivated by the deposition of coke upon the catalyst. Specific details of the various contact zones, regeneration zones, and stripping zones along with arrangements for conveying the catalyst between the various zones are well known to those skilled in the art.

The rate of conversion of the feedstock within the reaction zone is controlled by regulation of the temperature of the catalyst, activity of the catalyst, quantity of the catalyst (i.e., catalyst to oil ratio) and contact time between the catalyst and feedstock. The most common method of regulating the reaction temperature is by regulating the rate of circulation of catalyst from the regeneration zone to the reaction zone which simultaneously produces a variation in the catalyst to oil ratio as the reaction temperatures change. That is, if it is desired to increase the conversion rate, an increase in the rate of flow of circulating fluid catalyst from the regenerator to the reactor is effected.

The hydrocarbon product of the FCC reaction is recovered in vapor form and transferred to product recovery facilities. These facilities normally comprise a main column for cooling the hydrocarbon vapor from the reactor and recovering a series of heavy cracked products which usually include bottom materials, cycle oil, and heavy gasoline. Lighter materials from the main column enter a concentration section for further separation into additional product streams.

As the development of FCC units has advanced, temperatures within the reaction zone were gradually raised. It is now commonplace to employ temperatures of about 525° C. (975° F.). At higher temperatures, there is generally a loss of gasoline components as these materials crack to lighter components by both catalytic and strictly thermal mechanisms. At 1025° F. (550° C.), it is typical to lose 1% on the potential gasoline yield due to gasoline components thermally cracking into lighter hydrocarbon gases. As temperatures increase, to say 1075° F. (580° C.), most feedstocks lose up to 6% or more of the gasoline yield due to thermal cracking of gasoline components. Quench systems have been used to reduce the temperature of the cracked vapors downstream of an FCC reaction zone.

One improvement to FCC units, that has reduced the product loss by thermal cracking, is the use of riser cracking. In riser cracking, regenerated catalyst and starting materials enter a pipe reactor and are transported upward by the expansion of the gases that result from the vaporization of the hydrocarbons, and other fluidizing mediums if present, upon contact with the hot catalyst. Riser cracking provides good initial catalyst and oil contact and also allows the time of contact between the catalyst and oil to be more closely controlled by eliminating turbulence and backmixing that can vary the catalyst residence time. An average riser cracking zone today will have a catalyst to oil contact time of 1 to 5 seconds. A number of riser designs use a lift gas as a further means of providing a uniform catalyst flow. Lift gas is used to accelerate catalyst in a first section of the riser before introduction of the feed and thereby reduces the turbulence which can vary the contact time between the catalyst and hydrocarbons.

Riser cracking whether with or without the use of lift gas has provided substantial benefits to the operation of the FCC unit. These can be summarized as a short contact time in the reactor riser to control the degree of cracking that takes place in the riser and improved mixing to give a more homogeneous mixture of catalyst and feed. A more complete distribution prevents different times for the contact between the catalyst and feed over the cross-section of the riser such that some of the feed contacts the catalyst for a longer time than other portions of the feed. Both the short contact time and a more uniform average contact time for all of the feed with the catalyst has allowed overcracking to be controlled or eliminated in the reactor riser.

Unfortunately, much of what can be accomplished in the reactor riser in terms of uniformity of feed contact and controlled contact time can be lost when the catalyst is separated from the hydrocarbon vapors. As the catalyst and hydrocarbons are discharged from the riser, they must be separated. In early riser cracking operations, the output from the riser was discharged into a large vessel. This vessel serves as a disengaging chamber and is still referred to as a reactor vessel, although most of the reaction takes place in the reactor riser. The reactor vessel has a large volume. Vapors that enter the reactor vessel are well mixed in the large volume and therefore have a wide residence time distribution that results in relatively long residence times for a significant portion of the product fraction. Product fractions that encounter extended residence times can undergo additional catalytic and thermal cracking to less desirable lower molecular weight products.

In an effort to further control the contact time between catalyst and feed vapors, there has been continued investigation into the use of cyclones that are directly coupled to the end of the reactor riser. This direct coupling of cyclones to the riser provides a quick separation of most of the product vapors from the catalyst. Therefore, contact time for a large portion of the feed vapors can be closely controlled. One problem with directly coupling cyclones to outlet of the reactor riser is the need for a system that can handle pressure surges from the riser. These pressure surges and the resulting transient increase in catalyst loading inside the cyclones can overload the cyclones such that an unacceptable amount of fine catalyst particles are carried over with the reactor vapor into downstream separation facilities. Therefore, a number of apparatus arrangements have been proposed for direct coupled cyclones that significantly complicate the arrangement and apparatus for the direct coupled cyclones, and either provide an arrangement where a significant amount of reactor vapor can enter the open volume of the reactor/vessel or compromise the satisfactory operation of the cyclone system by subjecting it to the possibility of temporary catalyst overloads.

Although direct coupled cyclone systems can help to control contact time between catalyst and feed vapors, they will not completely eliminate the presence of hydrocarbon vapors in the open space of a reactor vessel. Product vapors are still present in this open space from the stripped hydrocarbon vapors that are removed from the catalyst and pass upwardly into an open space above the stripping zone. The residence time of hydrocarbon vapors is also increased by direct coupled cyclone arrangements that allow feed vapors or product vapors to enter the open space that houses the cyclones. Since the dilute phase volume of the reactor vessel remains unchanged when direct coupled cyclones are used and less hydrocarbon vapors enter the dilute phase volume from the riser, the hydrocarbon vapors that do enter the dilute phase volume will be there for much longer periods of time when a direct coupled cyclone system is used. (The terms "dense phase" and "dilute phase" catalysts as used in this application are meant to refer to the density of the catalyst in a particular zone. The term "dilute phase" generally refers to a catalyst density of less than 20 lbs/ft$^3$ and the term "dense phase" refers to catalyst densities above 30 lbs/ft$^3$. Catalyst densities in the range of 20 to 30 lbs/ft$^3$ can be considered either dense or dilute depending on the density of the catalyst in adjacent zones or regions.) In other words, when a direct coupled cyclone system is used, less product vapors may enter the open space of the reactor vessel, but these vapors will have a much longer residence time in the reactor vessel. As a result, any feed components left in the reactor vessel are substantially lost to overcracking.

The very low gas flow rate through the reactor vessel can also promote coke deposition on the interior of the vessel. The long residence time of heavy hydrocarbons at relatively high temperature in the upper section of the reactor vessel promotes the formation of coke. These coke deposits interfere with the function of the reactor vessel by forming thick deposits on the interior of the vessel thereby insulating and locally cooling portions of the metal shell. Such locally cooled portions promote the condensation of corrosive materials that can damage the reactor vessel. In addition, other problems are created by the large coke deposits which can, from time to time, break off in large chunks and block the flow of catalyst through the vessels or conduits.

One apparatus that has been known to promote quick separation between the catalyst and the vapors in the reactor vessels is known as a ballistic separation device which is also referred to as a vented riser. The structure of the vented riser in its basic form consists of a straight portion of conduit at the end of the riser and an opening that is directed upwardly into the reactor vessel with a number of cyclone inlets surrounding the outer periphery of the riser near the open end. The apparatus functions by shooting the high momentum catalyst particles past the open end of the riser where the gas collection takes place. A quick separation between the gas and the vapors occurs due to the relatively low density of the gas which can quickly change directions and turn to enter the inlets near the periphery of the riser while the heavier catalyst particles continue along a straight trajectory that is imparted by the straight section of riser conduit. The vented riser has the advantage of eliminating any dead area in the reactor vessel where coke can form while providing a quick separation between the catalyst and the vapors. However, the vented riser still has the drawback of operating within a large open volume in the reactor vessel.

DISCLOSURE STATEMENT

U.S. Pat. No. 4,792,437 discloses a ballistic separation device.

U.S. Pat. No. 4,295,961 shows the end of a reactor riser that discharges into a reactor vessel and an enclosure around the riser that is located within the reactor vessel.

U.S. Pat. No. 4,737,346 shows a closed cyclone system for collecting the catalyst and vapor discharge from the end of a riser.

U.S. Pat. No. 4,624,771, issued to Lane et al. on Nov. 25, 1986, discloses a riser cracking zone that uses fluidizing gas to pre-accelerate the catalyst, a first feed introduction point for injecting the starting material into the flowing catalyst stream, and a second downstream fluid injection point to add a quench medium to the flowing stream of starting material and catalyst.

U.S. Pat. No. 4,624,772, issued to Krambeck et al. on Nov. 25, 1986, discloses a closed coupled cyclone system that has vent openings, for relieving pressure surges, that are covered with weighted flapper doors so that the openings are substantially closed during normal operation.

BRIEF DESCRIPTION OF THE INVENTION

It is an object of this invention to improve processes and apparatus for reducing the hydrocarbon residence time in a reactor vessel.

It is another object of this invention to improve vented riser separation devices in an FCC reactor.

A further object of this invention is to decrease the available residence time for hydrocarbon vapors that enter the dilute phase of a reactor vessel.

This invention is an FCC process that uses a combination of ballistic separation and a compact separation device to create a low volume reactor vessel that restricts non-selective cracking of hydrocarbon vapors, reduces the size and cost of the reactor vessel and withstands upsets in the reactor operation. The invention uses a ballistic riser arrangement to provide a high initial separation of catalyst from the gas that exits the riser and transfers the gas and remaining catalyst particles to a compact separation system that houses a multiplicity of centrifugal separation devices. The compact separation system has a smaller diameter than a corresponding cyclone separator system and also eliminates the usual cyclone dip legs thereby permitting the whole riser and secondary separation system to fit a reactor vessel having up to ⅓ or less of the usual reactor volume. Eliminating a majority of the reactor volume alleviates the problem of overcracking in the reactor vessel by removing the volume in which such overcracking usually occurs. The reduced size of the reactor vessel that results from the reduction in the space requirements for the separation system saves expenses by drastically decreasing the size requirements for the reactor vessel. Moreover, the compact separation system will typically use in excess of 12 and more likely in excess of 24 small centrifugal separation devices. The presence of a large number of smaller separation devices provides overload capacity in the separation system to withstand temporary high catalyst loadings that result from pressure surges or other upsets in the operation of the FCC system. With the presence of a large number of small separation devices, temporary plugging of one or more devices will not interfere with the overall separation due to the large number of individual separators that still remain functional.

This invention stems from the discovery that arrangements of relatively small separation devices used in the past to retrieve very dilute loadings of extremely small size particles from gas streams can operate in a highly effective reactor arrangement to remove larger particles at higher catalyst loadings than have traditionally been used for such devices. Common types of centrifugal separation system that are used in large numbers include mini cyclones or swirl tubes. These centrifugal devices usually have a tubular configuration and are attached at the top and the bottom to upper and lower tube sheets. Swirl tube arrangements are fully described in U.S. Pat. Nos. 2,941,621, 3,137,133, 3,433,368 and 3,541,768, the contents of which are hereby incorporated by reference. Multiple arrangements including 24 or more swirl tubes have traditionally been used to remove particles ranging in size of from 25 to $\mu$m and at catalyst loadings of 0.0007 lbs/ft$^3$ or less. The multiplicity of centrifugal devices used in this invention will operate to remove catalyst particles ranging in size from 100 to 2 $\mu$m with catalyst loadings ranging from 0.05 to 0.2 lbs/ft$^3$. It has been determined that the multiplicity of centrifugal devices can receive the effluent from an initial separation device in an FCC reactor and then separate the remaining catalyst from the vapors at efficiencies comparable to cyclone arrangements in an arrangement having an overall diameter less than that required for a comparably efficient cyclone arrangement. Moreover, the small centrifugal devices do not require dip legs and thereby eliminate a substantial amount of tangent length from the reactor vessel. The elimination of dip legs and the overall smaller diameter of the compact separation system eliminates at least half of the reactor volume and in most cases more than ⅔ of the reactor volume. Thus, it has now been found that a multiplicity of centrifugal devices is not limited to application for removal of very small size particles at very low catalyst loading but also provides tremendous advantages in cost, reliability and product quality for an FCC operation.

Accordingly in one embodiment, this invention is a process for the fluidized catalytic cracking of an FCC feedstock. In this process an FCC feedstock and regenerated catalyst particles enter a reactor riser that transports the catalyst and feedstock upwardly converting the feedstock to product vapors and producing spent catalyst particles. The riser discharges a mixture of spent catalyst particles and product vapors upwardly into a dilute phase of the disengaging zone at least partially contained within a reactor vessel. Catalyst passes out of the disengaging zone to a stripping zone that contacts the catalyst with a stripping fluid. A separated stream of catalyst particles and product vapors collected from the dilute phase of the disengaging zone passes to a separation chamber. The separation chamber divides the separation stream into a plurality of separator inlet streams that pass into a plurality of centrifugal separators each having an inlet in the chamber and vapor outlet and a catalyst outlet communicating with the outside of the chamber. The catalyst outlets transport catalyst from the centrifugal separators into the stripping zone. Product vapors collected from the vapor outlets are collected as a product stream.

In another embodiment, this invention is an apparatus for the fluidized catalytic cracking of an FCC feedstock by contact with an FCC catalyst. The apparatus includes a upwardly directed riser having an upwardly directed outlet end. A reactor vessel surrounds the outlet end. A disengaging vessel at least partially contained within the reactor vessel also surrounds the outlet end. The disengaging vessel has a catalyst outlet located below the outlet end of the riser and a stripping vessel subadjacent to and in communication with the reactor vessel receives catalyst from the disengaging vessel. A separation chamber communicates with the disengaging vessel and contains a plurality of centrifugal separators. The centrifugal separators have vapor inlet in the chamber, a vapor outlet communicating with the outside of the chamber, and a catalyst outlet communicating with the subadjacent stripping vessel. Means for collecting a product stream takes product vapors from the outlets of the centrifugal separator and withdraws the product stream from the apparatus.

Other advantages, aspects, embodiments and details of this invention are set forth in the following detailed description of the invention.

DETAILED DESCRIPTION OF THE INVENTION

This invention relates generally to the reactor side of the FCC process. This invention will be useful for most FCC processes that are used to crack light or heavy FCC feedstocks. The process and apparatus aspects of this invention can be used to modify the operation and arrangement of existing FCC units or in the design of newly constructed FCC units.

This invention uses the same general elements of many FCC units. A reactor riser provides the primary reaction zone. A reactor vessel with a separation device removes catalyst particles from the gaseous product vapors. A stripping zone removes residual sorbed catalyst particles from the surface and pores of the catalyst. Spent catalyst from the stripping zone is regenerated in a regeneration zone having one or more stages of regeneration. Regenerated catalyst from the regeneration zone re-enters the reactor riser to continue the process. A number of different arrangements can be used for the elements of the reactor and regenerator sections. The description herein of specific reactor and regenerator components is not meant to limit this invention to those details except as specifically set forth in the claims.

Figure 1:
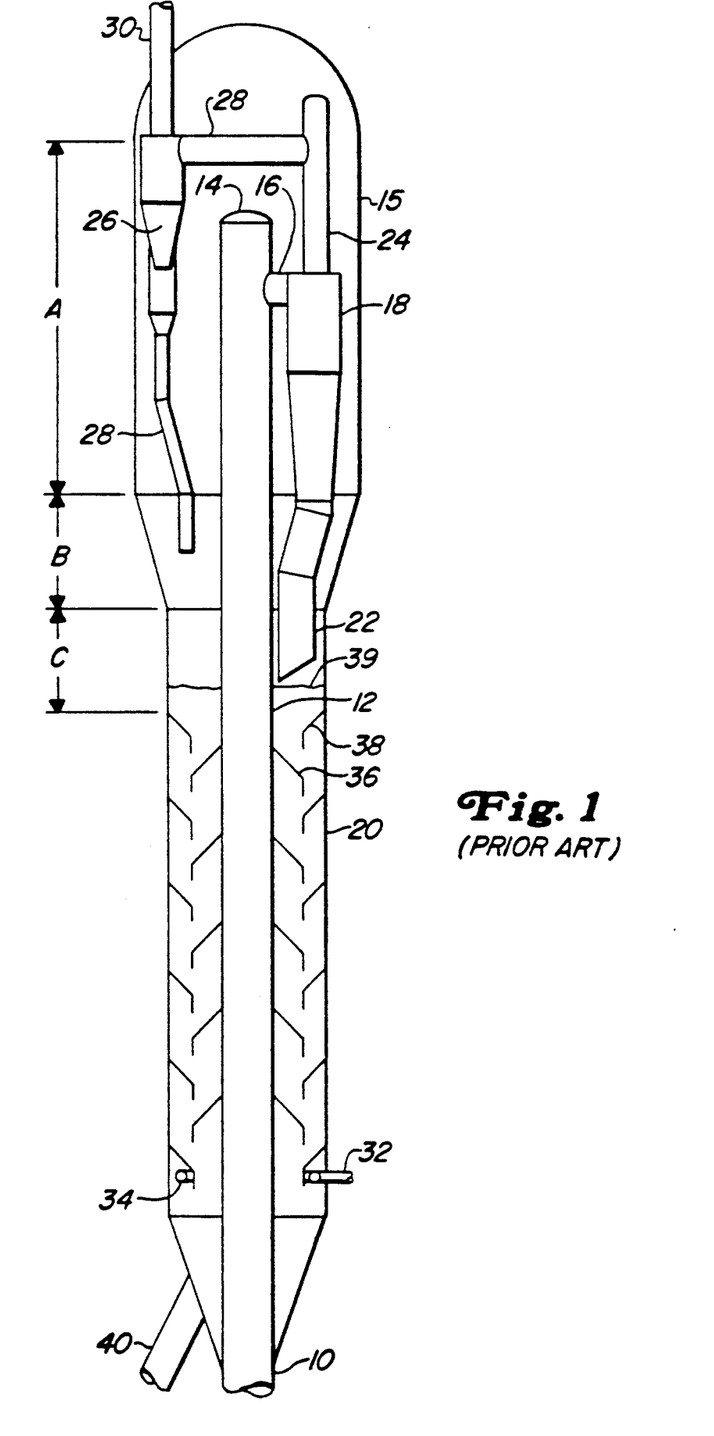
FIG. 1 is a sectional elevation of an FCC reactor depicting a typical closed coupled cyclone arrangement of the prior art and the associated reactor vessel.

An overview of a basic process operation of the prior art can be best understood with reference to FIG. 1. Regenerated catalyst from a catalyst regenerator (not shown) passes upwardly through a lower riser section 10. The mixture of feed and catalyst and lift gas travels upwardly into an internal riser section 12. The riser terminates at an end 14 located in a reactor vessel 15. Riser end 14 transfers a mixture of catalyst and product vapors via a conduit 16 to a first separation device in the form of a direct connected cyclone 18. Cyclone 18 performs an initial separation of the catalyst from the product vapors and returns catalyst to a stripping section 20 via a dip leg 22 while transferring product vapors with a dilute catalyst loading overhead through a top outlet 24 and into a second separation device 26 via a transfer conduit 28. The second separation device is another direct connected cyclone that performs a further separation of catalyst particles from the product vapors. Cyclone 26 returns the separated catalyst particles to the stripper vessel via dip leg conduit 28 and discharges product vapors via conduit 30 for further separation outside the reactor vessel. The conduit 30, referred to as the reactor vapor line, recovers the reactor effluent and transfers the hydrocarbon product vapor of the FCC reaction to product recovery facilities. These facilities normally comprise a main column for cooling the hydrocarbon vapor from the reactor and recovering a series of heavy cracked products which usually include bottom materials, cycle oil, and heavy gasoline. Lighter materials from the main column enter a concentration section for further separation into additional product streams.

Catalyst entering stripper 20 initially forms a top bed surface 39. Stripper 20 contacts downwardly descending catalyst with an upwardly rising stripping fluid that enters the bottom of the stripper through a nozzle 32 and a distributor 34. Inner baffles 36 extending outwardly from the riser and outer baffles 38 extending inwardly from the stripper shell cascade the catalyst back and forth as the stripping fluid rises to increase contact between the stripping fluid and the catalyst. A conduit 40 withdraws stripped catalyst from the bottom of stripper 20 and returns the catalyst to the regeneration zone for removal of carbon deposits. An oxygen-containing gas contacts catalyst in the regenerator and reacts with coke on the surface of the catalyst to combustively remove coke that is withdrawn from the regenerator as previously described and to produce a flue gas stream comprising the products of coke combustion that exits the regeneration zone. After regeneration, the catalyst again enters the bottom of the riser to continue circulation in the continuous FCC process.

Figure 2:
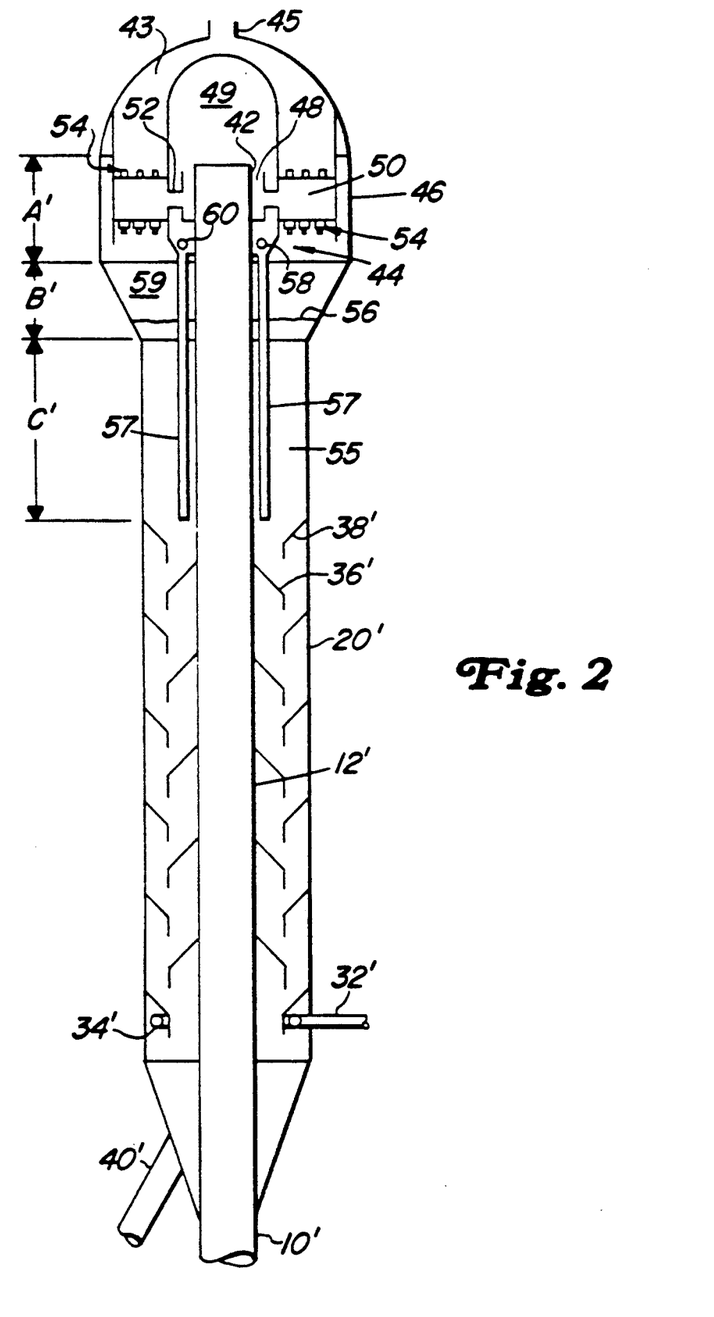
FIG. 2 is a sectional elevation illustrating a reactor of this invention that incorporates a combination of ballistic separation and a compact separation chamber.

Looking next to FIG. 2 which depicts the process and apparatus of this invention, the stripper section and a lower portion of the riser are essentially the same as that described in FIG. 1 and are numbered with prime numbers to indicate their essential equivalency to that previously disclosed in FIG. 1. FIG. 2 differs from FIG. 1 primarily in the details of the reactor vessel and the internal structures associated therewith.

Beginning then with the end of the riser, riser 12' terminates in an upwardly directed outlet end 42. Riser outlet end 42 is located in a disengaging zone in the form of a disengaging vessel 44 which in turn is located in a reactor vessel 46. The gas and catalyst are separated in a dilute phase section 49 of the disengaging vessel. The disengaging vessel has substantially closed sidewalls and a substantially closed top and bottom. Substantially closed is defined to mean that the disengaging vessel has only small nozzles or restricted openings. The restricted openings communicating fluids or catalyst into or out of the disengaging vessel or provide openings for conduits that pass through the wall of the vessel.

An outlet 48 collects the separated gases and small amounts of catalyst from dilute phase 49 and transfers this material to a separation chamber 50 via conduits 52. Separation chamber 50 contains a multiplicity of centrifugal separators 54 that swirl the gas and catalyst mixture to separate the heavier catalyst particles from the gas. Outlets at the top of centrifugal separators 54 withdraw the separated gases from the top of separation chamber 50 and a collection chamber 43 collects the gases for transfer out of the reactor by overhead conduit 45. Separated catalyst drops downward from outlets at the bottom of centrifugal separators 54 into a catalyst bed 55 having an upper surface 56.

Catalyst separated in disengaging chamber 44 drops from dilute phase section 49 into a lower section 58 of chamber 44 and out of the bottom of chamber 44 into bed 55 through dip legs 57. Stripping zone 20' strips catalyst entering from the disengaging chamber 44 and the centrifugal separators 54 in the manner previously described for stripping zone 20.

The countercurrently rising stripping medium, typically steam, from stripping vessel 20' desorbs hydrocarbons and other sorbed components from the catalyst surface and pore volume. Stripped hydrocarbons and stripping medium rise through bed 55 and into dilute phase 59 of reactor vessel 46. Stripping medium and stripped hydrocarbons can be removed from the dilute phase 59 in any manner that will maintain the desired relative pressure between the dilute phase and the interior of the riser, disengaging vessel and/or separation chamber. Preferably the dilute phase 59 has a pressure of from 0.2 to 0.5 psi lower than the pressure inside the separation chamber to vent desorbed hydrocarbons and stripping fluid through the bottom of the centrifugal separation devices into the separation chamber.

The sizing of the outlets 48, the separators 54, and the dig legs 57 establish a pressure balance throughout the system such that pressure continually decreases from the dilute phase 49 to the interior of chamber 50 to the dilute phase 59 to the collection chamber 43. In the embodiment of FIG. 2 the dip legs maintain a pressure differential of about 1 to 2.5 psi between dilute phase 49 and dilute phase 59. Therefore, FIG. 2 show the dip legs with an extended length submerged into bed 55. This submerged length will usually be less than 15 feet. Extending the length of dip legs 57 presents the simplest way to maintain the necessary pressure drop. Those skilled in the art are aware of other sealing devices that can reduce the dip leg length or replace the dip legs entirely.

The reactor riser used in this invention discharges into a device that performs an initial separation between the catalyst and gaseous components in the riser. The term "gaseous components" includes lift gas, product gases and vapors, and unconverted feed components. In such an arrangement the end of the riser will terminate with one or more upwardly directed openings that discharge the catalyst and gaseous mixture in an upward direction into a dilute phase section of the disengaging chamber or vessel. The open end of the riser is of an ordinary vented riser design as described in the prior art patents or of any other configuration that provides a substantial separation of catalyst from gaseous material in the dilute phase section of the reactor vessel. It is believed to be important that the catalyst is discharged in an upward direction in the disengaging vessel to provide good initial disengagement of the catalyst and gases. The flow regime within the riser will influence the separation at the end of the riser. Typically, the catalyst circulation rate through the riser and the input of feed and any lift gas that enters the riser will produce a flowing density of between 0.1 lb/ft$^3$ to 20 lb/ft$^3$, with typical catalyst densities below 5 lb/ft$^3$ and an average velocity of about 10 ft/sec to 100 ft/sec for the catalyst and gaseous mixture. The length of the riser will usually be set to provide a residence time of between 0.5 to 10 seconds at these average flow velocity conditions. Other reaction conditions in the riser usually include a temperature of from 920°-1050° F.

The preferred disengaging vessel of this invention will achieve up to 95 wt. % recovery or more of the riser gaseous components from the catalyst that returns to the reactor vessel without passing through the separation chamber. Since the catalyst that returns to the reactor usually has a void volume which will retain at least 7 wt. % of the riser gaseous components, some of the riser gaseous components must be displaced from the catalyst void volume in lower section 58 of dip legs 57 to achieve the over 95 wt. % recovery of product components. Lower section 58 contains a ring 60 for distribution of a displacement or stripping fluid in disengaging vessel 44. Preferably the discharge of catalyst from disengaging vessel 44 will maintain a dense bed in lower section 58. A dense bed is defined to mean a catalyst bed with a density of at least 20 lb/ft$^3$. Maintaining the dense catalyst bed below the riser outlet minimizes the dilute phase volume of the catalyst and riser products, thereby avoiding the aforementioned problems of prolonged catalyst contact time and overcracking. A low volume dense bed arrangement reduces the concentration of riser products in the interstitial void volume of the catalyst to equilibrium levels by passing a displacement fluid therethrough. Maintaining a dense bed and passing a displacement fluid through the bed allows a near complete displacement of the riser gaseous products from catalyst leaving the disengaging zone. Restricting the catalyst velocity through the dense bed also facilitates the displacement of riser gaseous components. The catalyst flux or catalyst velocity through the dense bed should be less than the bubble velocity though the bed. Accordingly the catalyst velocity through the bed should not exceed 1 ft/sec. Protracted contact of the catalyst with the displacement fluid a dense bed can also desorb additional gaseous riser products from the skeletal pore volume of the catalyst. The lower portion 58 of disengaging vessel 44 can also include a series of baffles to improve the contact of the catalyst with any stripping gas that passes upwardly through the vessel. However in order to obtain the prestripping advantage as previously described it is essential that a dense bed section is maintained in the disengaging vessel. Such stripping baffles, when provided, can function in the usual manner to cascade catalyst from side to side as it passes through the lower section of the disengager vessel and will be located below a dense bed section in the disengaging vessel. However, the benefits of increased product recovery must be balanced against the disadvantage of additional residence time for the reactor products in the separation device.

Figure 3:
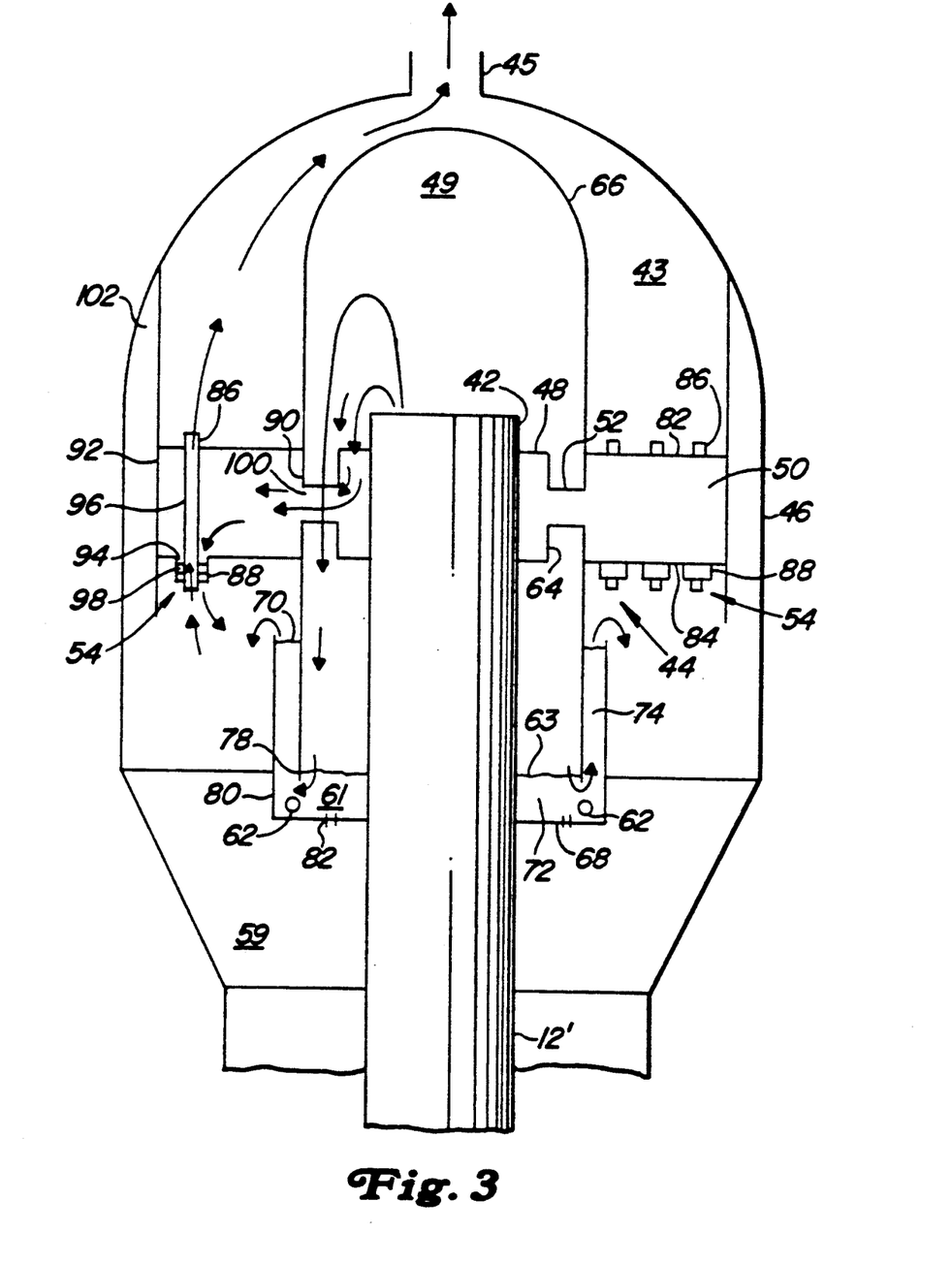
FIG. 3 is another sectional elevation showing an enlarged view of the ballistic separation system and an alternate arrangement for the compact separation chamber of this invention.

An enlarged view of the reactor vessel and is shown in FIG. 3. FIG. 3 shows the separation zone and centrifugal separators of FIG. 2 in more detail. FIG. 3 also an alternate arrangement for a catalyst hold-up device in the bottom of the disengaging vessel. The same reference numerals are used to denote similar equipment in FIGS. 2 and 3. The exact layout and nature of the separation zone and centrifugal separators can be more fully understood by reference to FIG. 3.

Referring then to FIG. 3, the velocity at which the catalyst and gaseous mixtures discharge from end 42 of the riser also influences the placement of the end of the riser relative to the top of the disengaging vessel 44. This distance is set on the basis of the flow rate to riser. In the interest of minimizing the dilute volume of catalyst in the disengaging vessel this distance should be kept as short as possible. Nevertheless, there is need for some space between the end of the riser and the top of the disengagement vessel. Providing some distance avoids direct impingement of catalyst on the top and the resulting erosion of the top of the disengaging vessel. Moreover, the discharge of catalyst from the end of the riser requires a space to provide a separation while preventing the re-entrainment of catalyst particles with the collected gas stream. Since the reactor riser is usually designed for a narrow range of exit velocities between 10 to 100 ft/sec, the distance between the riser outlet end 42 and the top of disengaging vessel 44 should be at least 1 riser diameter or more in order to avoid erosion. The avoidance of catalyst re-entrainment after discharge of the riser is influenced by both the riser velocity and the flowing density of the catalyst as it passes downward through the disengaging vessel. For most practical ranges of catalyst density in the riser a distance of 1 to 6 riser diameters between the end of the riser and the top of disengagement vessel 44 is adequate for a flowing catalyst density, often referred to as "catalyst flux", of about 50–200 lb/ft$^2$/sec. More preferably this distance will be in a range of from 1.5 to 3 riser diameters.

The disengager vessel 44' of FIG. 3 maintains a dense bed and the total dilute phase volume of the vessel is determined by the diameter of the disengager vessel, the distance from the end of the riser to the top of the disengager vessel, and the distance from the discharge end of the riser to the top 61 of the dense bed 63. Preferably, all of these dimensions are minimized to produce a low volume disengaging vessel. Stripping fluid, typically steam from a distributor 62, contacts catalyst in the bed 63. In order to minimize re-entrainment of catalyst particles into the any gases that rise from catalyst bed 63, a vertical space must separate riser outlet end 42 and the upper bed level 61. The desired length of this space, is primarily influenced by the superficial velocity of the gases that flow upwardly through dense bed 63. A superficial velocity typically preferably below 0.5 ft/sec will minimize the potential for re-entrainment of the gaseous compounds passing through bed 63. The gaseous components passing upward through bed 63 include hydrocarbons that are desorbed from the surface of the catalyst and a stripping fluid stream. As long as the superficial velocity of the gases rising through bed 63 stays below about 1.0 ft/sec and preferably below about 0.5 ft/sec, a distance of 2 feet or one riser diameter from bed surface 61 to riser end 42 will prevent substantial re-entrainment of the catalyst and the gases exiting the reactor vessel. More typically the distance between bed surface 61 and riser end 42 will equal 4 feet, which roughly equates to 2 to 3 riser diameters.

The amount of stripping gas entering the disengaging zone from distributor 62 is usually proportional to the volume of voids in the catalyst passing therethrough. It is preferred that the amount of stripping gas entering the disengaging vessel be adequate to displace hydrocarbons from the interstitial void area of the catalyst. For most reasonable catalyst to oil ratios in the riser, the amount of stripping gas that must be added to displace the interstitial void volume of the catalyst will be about 1 wt % of the feed. In order to obtain the disengager stripper function, also called pre-stripping, the catalyst in the bottom of the disengager vessel must be maintained as a dense bed. The dense bed minimizes the interstitial voidage of the catalyst. As previously mentioned the catalyst bed at dense conditions operates in a bubble phase where gas moves upwardly relative to the catalyst bed. In order to keep gas passing upwardly and out of the bed the downward velocity of the catalyst in the bed must not exceed the approximately 1 foot per second relative upward velocity of the gas bubbles. Since the removal of the product vapors from the interstitial voids of the catalyst is dependant on equilibrium, a higher steam rate through the dense bed can recover additional amounts of product hydrocarbons from the interstitial as well as the skeletal voids of the catalyst. As more stripping medium enters the disengaging vessel it will provide a more complete stripping function. However, as the addition of stripping medium to the dense bed increase so does the entrainment of catalyst out of the bed and the carry-over of catalyst into the separation chamber 50 shown in FIG. 3.

The manner in which the gaseous vapors are withdrawn from the dilute phase volume of the disengager vessel will also influence the initial separation and the degree of re-entrainment that is obtained in the disengager vessel. In order to improve this disengagement and avoid re-entrainment, FIG. 3 shows the an annular collector or cup 64 that surrounds the end 42 of the riser in more detail. Typically, conduit 52 supports cup 64 from the top of the reactor vessel 46 through separation chamber 50 and disengager vessel 44'. With support from the vessel 44', cup 64 does not contact riser 12'. A small annular space between cup 64 and riser 12' allows relative movement between the riser and the cup to accommodate thermal expansion. Conduits 52 are symmetrically spaced around the annular collector 64 and communicate with the annular collector through a number of symmetrically spaced openings to obtain a balanced withdrawal of gaseous components around the entire circumference of the reactor riser. In FIG. 3, cup 64 withdraws all of the gaseous components and product vapors from the disengaging zone. Separation chamber receives all of the withdrawn gases and catalyst from cup 64.

Disengaging vessel 44' has an upper section 66 and a lower section 68. The diameter of upper section 66 is selected so that catalyst discharged from the riser will be deflected along the wall of the disengaging vessel and will preferentially travel along the outer area of the disengaging vessel. By streaming catalyst along the outer portions of the disengaging vessel section 66, catalyst is kept out of opening 48 of cup 64. In arrangements where gases are withdrawn from the dilute phase directly from the sidewall of the disengaging vessel, it may be beneficial to further decrease the diameter of the disengaging vessel to avoid a concentrated flow of catalyst along the outer wall of the disengaging vessel. In most cases, the minimum cross-section available for the downward flow of the catalyst from the riser will be equal to the cross-sectional area of the riser. Thus, in terms of cross-sectional area, the minimum transverse cross-section of the disengaging vessel is twice the cross-sectional area of the riser. Where a collector cup 64 is present, the inlet opening will typically have an annular cross-sectional area that again equals the diameter of the riser. Thus, where an annular collector is used, the cross-sectional area of the disengaging vessel may equal 3 to 6 times the cross-sectional area of the riser. It is possible to have more than 1 riser outlet end discharged into the disengaging vessel. In such cases, the sizing of the disengaging vessel would be based upon an effective diameter of the riser based on the total flowing cross-sectional area of the riser discharge ends.

As depicted in FIGS. 2 and 3, it is anticipated that the reactor arrangement will generally use a ballistic separation zone as a first separation system and a compact arrangement of centrifugal separation devices as a second separation system. However, other devices for the first separation system such as rough cut cyclones can provide the first stage of separation while still yielding the advantages of this invention. A particular arrangement of the disengaging zone and its location within the reactor vessel adds to the advantages of this invention.

Although the invention can be used with other first separation systems, the ballistic riser separation and the disengaging vessel arrangement of the preferred form of this invention is believed to reduce the overall volume of catalyst relative to most closed cyclone arrangements. The fact that this invention also reduces the amount of catalyst recovered by the cyclones over closed cyclone systems is important. As catalyst exits the riser, the disengaging vessel of this invention recovers at least 80 and up to 90% of the catalyst without passing the catalyst through the separation chamber. Again, stripping fluid contacts the catalyst as it passes through the disengaging vessel and removes the product vapors from the void volume of the catalyst in the dense bed of the disengaging vessel. Since up to 7 vol % of the hydrocarbon vapors leaving the riser can be carried out with the catalyst, this stripping of a majority of the catalyst in the restricted volume of the preferred disengaging vessel arrangement allows an additional 2 to 4% of the product vapors from the riser to be collected from the disengaging vessel. By the use of the ballistic discharge into the disengaging zone, the amount of catalyst withdrawn from the disengaging vessel into the separation chamber is greatly reduced such that typically less than 20 wt. % of catalyst entering the disengaging vessel will be withdrawn with the product stream entering the separation chamber. In addition, the dense bed occupies a substantial portion of the disengaging zone and thereby minimizes the dilute phase volume in which overcracking can occur. Further reductions in overcracking result from the immediate stripping of catalyst in the dense phase bed of the disengaging vessel.

Whatever first stage of separation receives the flow from the riser, it should preferably pass only a small amount of the catalyst that enters the process through the riser to separation chamber 50. In this manner most of the catalyst that enters the reactor vessel or the stripping zone is discharged from the dense bed of the disengaging vessel. Catalyst is preferably discharged from the dense bed of the disengaging zone in any manner that will maintain a dense bed in a disengaging vessel that can be stripped in the manner previously described. In addition, a catalyst seal is preferably maintained between the dilute phase of the disengaging vessel and the dilute phase of the reactor vessel while discharging catalyst from the disengaging vessel.

The lower section 68 of the disengaging vessel in FIG. 3 illustrates one method for discharging catalyst and maintaining a gas seal. In this arrangement, dense bed 58 flows downwardly as catalyst is discharged from an outlet 70. Bed 58 acts as a downcomer 72 for catalyst flow which then changes direction at the bottom of lower section 68 and begins to flow upwardly in an upcomer section 74 with catalyst spilling from opening 70. As gas disengages in bed 58, an effective gas seal is formed to inhibit the flow of gas out of the disengaging vessel. The upcomer and downcomer sections are preferably formed by a downwardly projecting extension 78 of the disengaging vessel sidewall that is overlapped by a sidewall 80 which extends upwardly from the bottom 68 of the disengaging vessel 44'. In this manner, the upper end of sidewall 80 forms an overflow weir that maintains catalyst in bed 58 at the top bed level 60.

The height of bed level 61 with respect to outlet 70 will along with the overlap and distance between extension 78 and sidewall 80 vary the pressure differential between the inside of the disengaging vessel and the inside of the reactor vessel. In the typical operation previously described the the reactor vessel will operate at a pressure of at a lower pressure than the interior of the disengaging vessel. This negative pressure differential creates a head of catalyst in the downcomer and maintains the top 63 of bed 61 below top of sidewall 80. The difference in height between the top 61 of the catalyst bed and the overflow level of catalyst from upcomer 74 varies with the catalyst density in the upcomer and downcomer as well as the differential pressure between the reactor and disengaging vessels. Since the stripping operation usually lowers the catalyst density in the downcomer relative to the upcomer, a $\frac{1}{4}$ lb pressure differential usually produces about a 1 foot difference in the height between top of bed 61 and the top of the catalyst crest as it overflows out of outlet 70.

The lowermost portion of the disengaging zone is designed to maintain catalyst flow and to make the disengaging zone self emptying during shutdown. The bottom of the disengaging vessel also includes one or more small drain ports 82 which serve to empty the bottom of the disengaging vessel when the FCC unit ceases operation, but do not otherwise substantially affect the flow of catalyst through the dense bed of the disengaging vessel.

A majority of the product vapors and, when used with the preferred disengaging vessel, more than 95% of the product vapors enter the separation chamber 50. The separation chamber houses any type of centrifugal separation device that has a relatively short length and diameter. Typical centrifugal separation devices of this type are mini cyclones or swirl tubes. FIG. 3 depicts a multiplicity of swirl tubes supported by an upper tube sheet 82 and a lower tube sheet 84. On the left side of FIG. 3, the section of the reactor vessel shows gas outlets 86 of the swirl tubes extending above upper tube sheet 82 for communicating product vapors into collection chamber 43. The left side of FIG. 3 also shows a catalyst outlet 88 projecting below lower tube sheet 84 to discharge catalyst separated by the swirl tubes into the subadjacent stripping vessel. In the preferred embodiment of this invention, the sides of separation chamber 50 are formed by a section 90 of the outer wall of disengaging vessel 66 and a cylindrical support cylinder 92 that depends from the upper wall of reactor vessel 46. The left section of FIG. 3 shows a cross-section of a swirl tube 54. In the embodiment depicted by FIG. 3, the swirl tube consists of an annular outlet 94 for catalyst and gas and a tube 96 that extends below the bottom of catalyst outlet 88 and above the top of tube sheet 82. In most cases at least 50% of the length of centrifugal separation device is located in the separation chamber. As a mixture of catalyst and gas enters the disengaging chamber through an inlet 100 passes through the top of annular outlet 94 it contacts swirl vanes 98 that centrifugally accelerate the catalyst particles so that catalyst discharges outwardly from the outlet 88 while the lower density gas turns and travels through tube 94 for collection in chamber 43. A typical swirl tube will have a maximum height of 48 inches and a maximum diameter of from 8 to 10 inches.

The outer wall of disengaging vessel 66, the inner wall of tube support skirt 92, reactor vessel 46 and the top of tube sheet 82 define chamber 43 which collects all of the product vapors for discharge through outlet nozzle 45. This collection of product vapors in collection chamber 43 eliminates the dead space in the top of the reactor vessel usually produced by cyclone configurations and which was susceptible to coking. The relatively small inactive area 102 between support skirt 92 and the inside of reactor vessel 46 is readily filled with packing or other material to eliminate the condensing of coke precursors along the inside of the reactor vessel.

All of the catalyst that drains from the disengaging vessel and the separation chamber passes through an additional stripping zone as previously described. The composition of the stripping fluid is typically steam, the usual stripping medium for FCC units. Once the stripping fluid has contacted the catalyst in the additional stripping zone, it is withdrawn from the reactor vessel. The stripping effluent from outside the disengaging vessel may be withdrawn directly from the stripping zone or reactor vessel, or passed back into the disengaging vessel and withdrawn with the gaseous components from the disengaging vessel. It is preferred that no stripping effluent that enters the disengaging zone pass through catalyst bed 58. Thus gas from the lower stripping zone preferably enter disengaging vessel 44 above bed surface 60. More preferably gas from the lower stripper will enter separation chamber directly. The central conduit 96 of the swirl tube arrangement provides an advantageous means of evacuating stripping gas from the dilute phase 59 above the lower stripper.

EXAMPLE

In order to demonstrate the advantages of a reactor designed in accordance with this invention, two FCC units are designed to process 50,000 barrels per day of an FCC feedstock comprising a mixture of vacuum gas oil. The following example is based on engineering design calculations and empirical data from experimental modeling and operating FCC units. The FCC feedstock was contacted with catalyst at a catalyst to oil ration of 7. In both cases, the feed passed through an identically sized riser having equivalent lengths for a total residence time of about 2 seconds. In both examples catalyst separated by the different separation devices in the reactor vessels enters a stripping vessel where it is contacted with stripping steam before the catalyst exits the bottom of the stripping vessel.

CASE 1

In Case 1, the reactor vessel had a configuration as shown in FIG. 1. Fitting a closed coupled cyclone separation type system into the reactor shown in FIG. 1 required a reactor diameter of 18 feet. Accommodating the dip legs of the cyclones required a total tangent length, as shown in FIG. 1 by Dimension A, of 28 feet for the reactor vessel, a reducer length of 9 feet shown by Dimension B and a length of 6 feet from the reducer to the top of the stripper. The closed coupled cyclone system achieved an essentially complete separation of catalyst particles from the product vapors withdrawn via conduit 30. An analysis of the product recovered from conduit 30 is presented in Table 1. The cyclone arrangement of FIG. 1 used two sets of cyclones directly connected to the reactor riser.

TABLE 1

| WT. % YIELDS | |
|---|---|
| $H_2S$ | .52 |
| $C_2^-$ | 3.03 |
| $C_3$ | 4.69 |
| $C_4$ | 9.96 |
| $C_5^-$ 430 F | 48.72 |
| 430$^-$ 650 F | 20.25 |
| 650$^+$ F | 8.10 |
| COKE | 4.73 |

CASE 2

In order to compare the relative size of the reactor vessel and the operation of a process designed in accordance with this invention, a reactor vessel similar to that depicted in FIG. 2 was designed. Housing the disengaging vessel and separation chamber required a total reactor diameter of 16 feet. The overall height requirements of the reactor vessel were determined by the size of the disengaging vessel. The relatively short length of the separation chamber greatly reduced the total tangent length, A', of the reactor vessel which required only 10 feet. Due to the absence of dip legs, the reducer length B' for Case 2 was only 5.75 feet. In addition, the length of the stripper above the first stripper grid was 14 feet. The disengaging vessel and separation chamber operated to achieve an essentially complete removal of fine catalyst particles from the product vapors that were recovered from the top of the reactor vessel. The product recovered from the top of the reactor vessel has the properties listed in Table 2.

TABLE 2

| WT. % YIELDS | |
|---|---|
| $H_2S$ | .52 |
| $C_2^-$ | 2.70 |
| $C_3$ | 4.59 |
| $C_4$ | 9.75 |
| $C_5^-$ 430 F | 49.16 |
| 430$^-$ 650 F | 20.45 |
| 650$^+$ F | 8.18 |
| COKE | 4.65 |

A comparison of Case 1 and Case 2 shows a substantially reduced volume of the reactor vessel which was reduced in diameter as well as length. Overall the height reduction of the reactor vessel in Case 2 compared to Case 1 is 14 ft. The reactor designed according to Case 2 and this invention has approximately one-third the dilute phase volume of that in the design of Case 1. Therefore, the volume in which uncontrolled cracking can occur is greatly reduced by the use of the separation chamber of this invention. Moreover, the separation chamber and the recovery of product vapors therefrom produces a design that substantially eliminates stagnant volumes where coking can occur. Finally this comparison is based on the use of dip leg length alone (dip leg 57) to establish pressure differential between the interior of the separation device and the reactor vessel. The use of other known sealing devices for catalyst discharge from the disengaging vessel would add further to the total height decrease obtained by this invention.

The foregoing description sets forth the essential features of this invention which can be adapted to a variety of applications and arrangements without departing from the scope and spirit of the claims hereafter presented.

We claim:

1. A process for the fluidized catalytic cracking (FCC) of an FCC feedstock, said process comprising:
    a) passing said FCC feedstock and generated catalyst particles to a reactor riser and transporting said catalyst and feedstock upwardly through said riser thereby converting said feedstock to product vapors and producing spent catalyst particles by the deposition of coke on said regenerated catalyst particles;
    b) discharging a first mixture of spent particles and product vapors from a discharge end of said riser upwardly into a dilute phase of a disengaging zone at least partially contained within a reactor vessel;

c) passing catalyst out of said disengaging zone to a stripping zone and contacting catalyst in said stripping zone with a stripping fluid stream;

d) collecting a separated stream comprising catalyst particles having a particle size ranging from 25 to 100 μm and at least a portion of said product vapors from said dilute phase of said disengaging zone said separated stream having a catalyst loading ranging from to 0.05 to 0.2 lbs/ft.$_3$ and passing said separated stream to a separation chamber contained within said reaction vessel;

e) dividing said separated stream in said separation chamber into a plurality of separator inlet streams and passing said separator inlet streams into a plurality of centrfugal separators each having an inlet in said chamber and a vapor outlet and a catalyst outlet communicating with the outside of said chamber;

f) transporting catalyst from the catalyst outlets of said centrifugal separators into said stripping zone; and, g) collecting a vapor product stream from the vapor outlets of said centrifugal separators.

2. The process of claim 1 wherein said separated stream passes into a single separation chamber.

3. The process of claim 1 wherein said vapor outlets discharge upwardly out of said chamber and said catalyst outlets discharge downwardly out of said chamber.

4. the process of claim 1 wherein at least 50% of each of said centrifugal separator has a location within said chamber.

5. A process for the fluidized catalytic cracking (FCC) of an FCC feedstock, said process comprising:

a) passing said FCC feedstock and regenerated catalyst particles to a reactor riser and transporting said catalyst and feedstock upwardly through said riser thereby converting said feedstock to product vapors and producing spent catalyst particles by the deposition of coke on said regenerated catalyst particles;

b) discharging a first mixture of spent catalyst particles and product vapors from a discharge end of said riser upwardly into a dilute phase of a substantially closed disengaging zone at least partially contained within a reactor vessel;

c) collecting catalyst in said disengaging zone and forming a dense bed of catalyst in said disengaging zone below said discharge end of said riser;

d) passing a first stripping fluid stream into said disengaging zone and upwardly through said dense bed and stripping hydrocarbons from said catalyst in said dense bed and passing a first stripping effluent fluid upwardly from said dense bed into said dilute phase;

e) maintaining a vapor seal between said disengaging zone and reactor vessel to restrict the flow of product vapors out of said disengaging zone;

f) passing catalyst out said disengaging zone from said dense bed to a stripping zone and contacting catalyst in said stripping zone with a second stripping fluid stream, passing a second stripping effluent out of said stripping zone and withdrawing said second stripping effluent from said process; and, g) collecting a separated stream comprising catalyst particles, having a particle size ranging from 25 to 100 μm said product vapors, and first stripping effluent from said dilute phase of said disengaging zone, said separated stream having a catalyst loading ranging from 0.05 to 0.2 lbs/ft$^3$ and passing said separated stream to a separation chamber contained within said reaction vessel;

h) dividing said separated stream in said separation chamber into a plurality of separator inlet streams and passing said separator inlet streams into a plurality of centrifugal separators each having an inlet in said chamber and an upper vapor outlet and a lower catalyst outlet communication with the outside of said chamber;

i) dropping catalyst from the catalyst outlets of said centrifugal separators into said stripping zone; and, j) collecting a vapor product stream from the vapor outlets of said centrifugal separators and recovering said product stream from said process.

6. The process of claim 5 wherein the catalyst passing out of said disengaging zone provides at least a part of said vapor seal.

7. The process of claim 6 wherein catalyst is passed out of said disengaging zone from a lower portion of said dense bed.

8. The process of claim 5 wherein said stripping zone is subadjacent said reactor vessel and said second stripping effluent passes from said reactor vessel into said catalyst outlets of said centrifugal separators.

9. The process of claim 5 wherein said separated stream is withdrawn from a collector having an inlet adjacent to said riser.

10. The process of claim 5 wherein said centrifugal separator comprises a swirl tube.

11. The process of claim 5 wherein said centrifugal separator has a length of less than 48 inches.

12. The process of claim 5 wherein said separated stream passes to a separation chamber and said separation chamber has at least 12 centrifugal separators located therein.

* * * * *

UNITED STATES PATENT AND TRADEMARK OFFICE
CERTIFICATE OF CORRECTION

PATENT NO. : 5,328,592
DATED      : JULY 12, 1994
INVENTOR(S) : BRIAN W. HEDRICK

It is certified that error appears in the above-identified patent and that said Letters Patent is hereby corrected as shown below:

In Column 16, line 60: Change "generated" to --regenerated--.

Signed and Sealed this

Eleventh Day of October, 1994

Attest:

BRUCE LEHMAN

Attesting Officer

Commissioner of Patents and Trademarks